(No Model.)
F. R. SMITH.
MOP WRINGER.
No. 396,436. Patented Jan. 22, 1889.
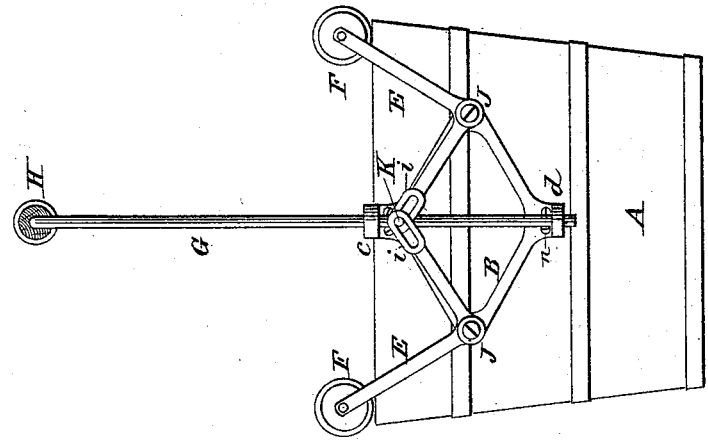
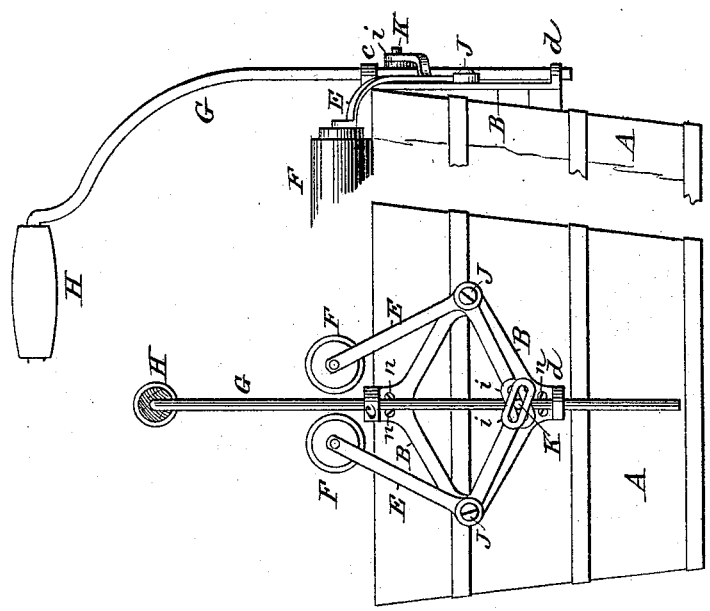
WITNESSES,
C. E. Canfield
Jno. W. Essex
INVENTOR,
F. ROLLIN SMITH.
by Franklin Scott, Atty.

UNITED STATES PATENT OFFICE.

F. ROLLIN SMITH, OF BENNINGTON, VERMONT.

MOP-WRINGER.

SPECIFICATION forming part of Letters Patent No. 396,436, dated January 22, 1889.

Application filed July 8, 1887. Serial No. 243,731. (No model.)

*To all whom it may concern:*

Be it known that I, F. ROLLIN SMITH, of the town of Bennington, in the county of Bennington and State of Vermont, have invented certain Improvements in Mop-Wringers, of which the following description, in connection with the accompanying single sheet of drawings, constitutes a specification.

The nature and object of this invention are disclosed in its title. It is shown in the drawings as applied to an ordinary bucket or pail.

Figure 1 shows the apparatus in side elevation with the squeezing-rollers distended ready for the insertion of the mop. This position of the parts is maintained when the pail is carried about by the bail. Fig. 2 shows the position of the bail levers and rolls when wringing a mop. Fig. 3 is a view of one side of the pail, taken at a right angle with that shown in Fig. 1.

My apparatus consists of a common pail, A, to each side of which is attached a light metallic casting, B, by means of screws $n\ n$. This casting is of suitable shape to pivot to it at the points J J the bell-crank levers E E, and is also provided on each side of the pail with the perforated lugs $c$ and $d$, through which the bail G plays vertically. The bell-crank levers E E, pivoted at J J, act in pairs, each pair supporting a roller, F, which is journaled in the upper ends of the perpendicular arms of the levers E E. The horizontal arms of said levers are slotted, as at $i\ i$, and cross each other, as shown. The pins K K project from the bail G and coact with the slots $i\ i$ of the levers. When the bail is lifted by the handle H, the horizontal arms of levers E E are elevated and the levers, turning on pivots J J, separate the rollers F F until they rest upon the top of the pail, as seen in Fig. 1. In this position the pail may be emptied, filled, or carried about conveniently. To wring the mop, it is inserted between the rollers while in this position, and the operator then seizing handle H with one hand and holding the mop-handle in the other presses bail G down firmly. This downward movement causes the rollers to be brought tightly together upon opposite sides of the mop, which is thus firmly grasped between them. Then the mop is drawn out with one hand, while the pail is held firmly to the floor with the other. All danger of capsizing the pail is obviated, and the work is effected with the operator in a posture of vantage and by an easy, rapid, and perfectly natural motion.

I claim as my invention and new—

1. The combination, with a pail, of two pairs of bell-crank levers pivoted on the pail—one pair on each side thereof—a pair of rollers journaled in the outer co-ordinate arms of said levers and parallel to each other, and a vertically-sliding bail-handle adapted to slide in guideways attached to the sides of the pail and fitted with suitable provisions for connecting with the inner co-ordinate arms of said levers, substantially as shown, whereby the vertical movements of said bail will cause said rollers to approach and recede from each other, substantially in the manner described, and for the purposes set forth.

2. The combination, with a pail, of the casting B, provided with lugs $c\ d$, the bell-crank levers E, pivoted thereon and having slots in their inner arms, and rolls F, journaled in their outer arms, and the bail G, passing through lugs $c\ d$ and provided with pins K, which engage the slots in the inner ends of the bell-crank levers, whereby the upward movement of the bail separates the rolls and the downward brings the rolls into operative position, substantially as described, and for the purposes set forth.

In testimony whereof I have hereto subscribed my name, at Bennington, Vermont, this 1st day of July, A. D. 1887.

F. R. SMITH.

In presence of—
FRANKLIN SCOTT,
C. E. CANFIELD.